UNITED STATES PATENT OFFICE.

CHARLES A. DARDS, OF NEW YORK, N. Y.

IMPROVEMENT IN COMPOSITIONS OR CEMENTS FOR PRESERVING FRUIT, &c.

Specification forming part of Letters Patent No. 178,913, dated June 20, 1876; application filed May 1, 1876.

*To all whom it may concern:*

Be it known that I, CHARLES A. DARDS, of the city, county, and State of New York, have invented a new and Improved Preserve Composition for Fruits, &c., of which the following is a specification:

The object of my invention is to provide an improved preserve composition for fruits, vegetables, and other perishable articles by which they may be securely and hermetically packed for shipping so as to preserve for considerable length of time their original taste and flavors, and admit the shipment of fruit to any distance in a perfectly reliable manner.

The invention consists of a composition prepared of starch, a suitable fat or oil, salt, carbonate of ammonia, vermifuge, alum, citric acid, and water, in the following manner and proportions: Five hundred parts of starch; thirty parts of a suitable fat or oil; twenty-five parts of common salt; five parts of carbonate of ammonia; fifteen parts of a suitable vermifuge—as, for instance, madder; five parts of citric acid, and ten parts of alum are dissolved and thoroughly mixed in a suitable quantity of water until a cement-like paste is obtained.

This composition is employed for the purpose of closing or sealing a soft wrapping-paper that has been rendered air-tight by a mixture of oil and alum around the fruit, vegetable, or other perishable article. The paper is wrapped by one hand around the fruit or other article, and sealed by means of the composition applied with the other hand. The articles are then packed into boxes, filled with saw-dust, cork, shavings, cut straw, and husks or other protecting substances, and kept in a fresh state for any length of time, so as to admit the reliable shipping of fruit to any distance.

Having thus described my invention, what I claim as new, and desire to secure by Letters Patent, is—

A composition or cement for preserving fruit, vegetables, and other articles, consisting of starch, a suitable fat or oil, salt, carbonate of ammonia, a suitable vermifuge, alum, citric acid, and water, in about the proportions specified, substantially as described.

CHARLES A. DARDS.

Witnesses:
PAUL GOEPEL,
H. SALOUPEAU.